United States Patent Office 3,431,494
Patented Mar. 4, 1969

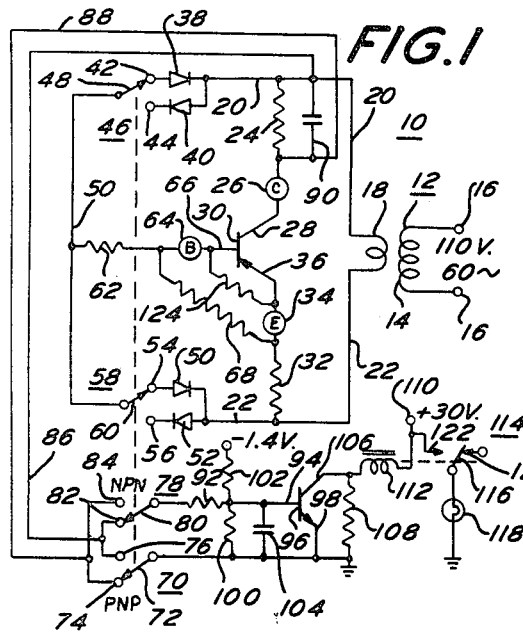
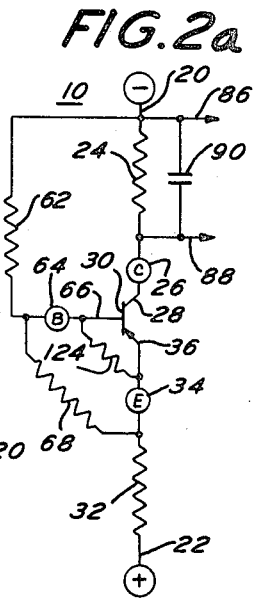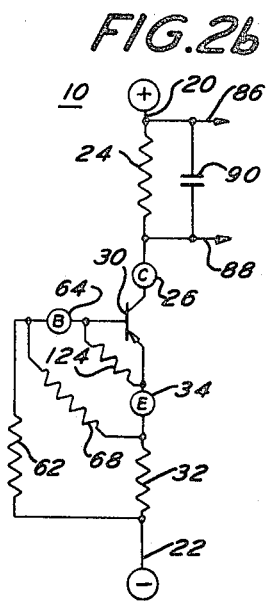
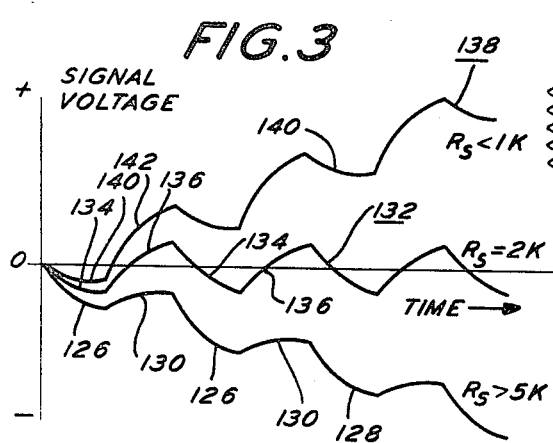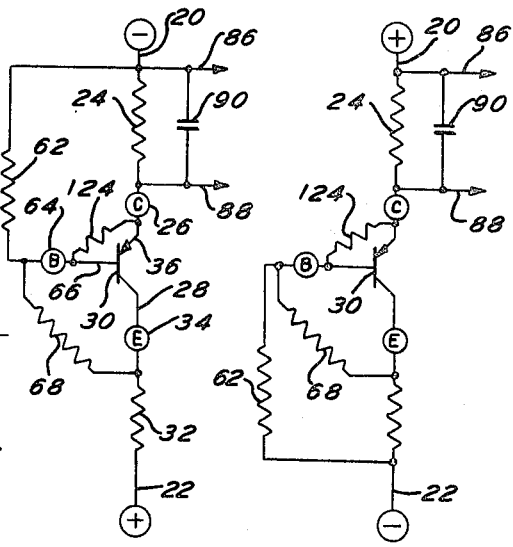
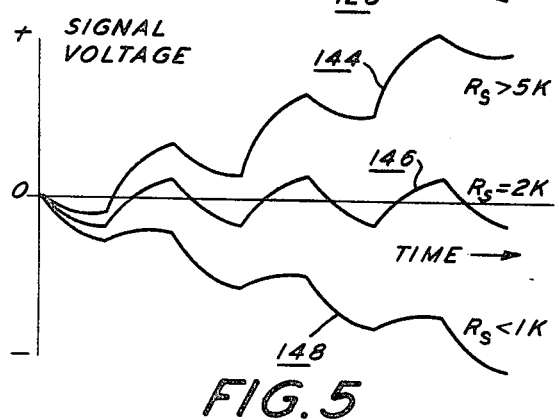
INVENTOR
THOMAS J. RYAN
BY Jacob Trachtman
ATTORNEY and more particularly to a testing apparatus for in-circuit transistors.

3,431,494
IN-CIRCUIT TRANSISTOR TESTING APPARATUS
Thomas J. Ryan, Buckingham, Pa., assignor to American Electronic Laboratories, Inc., Colmar, Pa., a corporation of Pennsylvania
Filed Dec. 24, 1964, Ser. No. 420,913
U.S. Cl. 324—158
Int. Cl. G01r 31/00, 31/02, 31/22
9 Claims

ABSTRACT OF THE DISCLOSURE

An in-circuit transistor testing apparatus comprising first, second and third connecting means for respectively electrically engaging the first base lead, the second and third leads of the transistor to be tested, energizing means having first and second terminals for delivering an alternating voltage, first and second impedance means respectively connecting the second and third connecting means with the first and second terminals of said energizing means, first and second unidirectional conducting means joining the first connecting means respectively with first and second terminals of said energizing means, a third shunt impedance means connecting the first and second connecting means, and means for detecting directional current flow through said transistor and providing a predetermined signal for determining the operativeness of the in-circuit transistor being tested.

---

The invention relates to a transistor testing apparatus, and more particularly to a testing apparatus for in-circuit transistors.

In testing transistors which are connected in particular circuits, it is of great advantage to determine the operativeness of such transistors without removing the transistors from their associated circuits or in any way severing their connections with other elements in their circuits. The ability to test transistors in-circuit, in addition to avoiding possible damage to the transistors in-circuit by removal of the transistors for testing purposes, also provides great convenience and efficiency in performing the required tests.

It is, therefore, a primary object of the invention to provide a new and improved transistor testing apparatus for transistors while positioned in circuit.

Another object of the invention is to provide a new and improved transistor testing apparatus for in-circuit transistors which is highly accurate even though the transistors may be connected in various configurations having different shunt impedances.

Another object of the invention is to provide a new and improved transistor testing apparatus which is highly simple in form and allows testing of transistors for emitter-collector short circuits.

Another object of the invention is to provide a new and improved transistor testing device which allows testing of transistors for determining their amplification capabilities.

Another object of the invention is to provide a new and improved transistor testing apparatus which can test transistors which are connected either in-circuit or are out of circuit for determining their operativeness.

Another object of the invention is to provide a transistor testing apparatus for testing transistors when the collector and emitter leads are unknown.

Another object of the invention is to provide a new and improved transistor testing apparatus for testing NPN type or PNP type transistors.

Another object of the invention is to provide a new and improved transistor testing apparatus for contacting the leads of an in-circuit or out of circuit transistor and automatically indicating the operativeness of the transistor being tested.

Another object of the invention is to provide a new and improved transistor testing apparatus which is highly simple in construction and operation.

The above objects as many other objects of the invention are achieved by providing an in-circuit transistor testing apparatus comprising first, second and third connecting means, respectively, electrically engaging the first base lead, and the second and third leads of the transistor to be tested, and energizing means having first and second terminals for delivering an alternating voltage. First and second impedance means respectively connect the first and second connecting means with the first and second terminals of the energizing means, while first and second unidirectional means joins the first connecting means respectively with first and second terminals of the energizing means.

A third shunt impedance means connects the first and second connecting means, while means are provided for detecting directional current flow through the transistor under test for determining the operativeness of the in-circuit transistor.

The first and second unidirectional conducting means comprise crystal diode units, while said third shunt impedance means has an impedance of less than 1,000 ohms and the means for detecting the directional current through the transistor detects the polarity and average voltage drop across said first impedance means for determining the operativeness of the in-circuit transistor being tested. The first and second impedance means and the third shunt impedance means are resistors.

Switching means are provided having first and second positions joining said first and second unidirectional conducting means with a predetermined polarity between said first connecting means and respectively said first and second terminals of said energizing means in its first position, and reversing the polarity of said unidirectional conducting means in its second position. The switching means in its first position poles the unidirectional means to conduct current in the direction from its respective terminal to the first connecting means for testing a PNP type transistor, while the switching means in its second position poles the unidirectional means to conduct current in its respective terminal from its first connecting means for testing an NPN type transistor.

The foregoing and other objects of the invention will become more apparent as the following detailed description of the invention is read in connection with the drawings, in which:

FIGURE 1 illustrates schematically the electrical circuit of an in-circuit transistor testing apparatus embodying the invention, FIGURE 2a illustrates schematically the equivalent circuit of FIGURE 1, during the application of a half cycle of alternating current to the apparatus, while FIGURE 2b illustrates schematically the equivalent circuit of FIGURE 1 during the application of the second half cycle of alternating current applied to the apparatus of FIGURE 1, FIGURE 3 graphically represents signal voltages for illustrating the operation of the apparatus shown in FIGURE 2a and FIGURE 2b, FIGURES 4a and 4b are schematic illustrations identical to those shown in FIGURES 2a and 2b, respectively, except for reversal of the connections of collector and emitter leads of the in-circuit transistor being tested, and FIGURE 5 graphically represents signal voltages for illustrating the operation of the apparatus shown in FIGURES 4a and 4b.

Like reference numerals designate like parts throughout the several views.

FIGURE 1 schematically illustrates an in-circuit transistor testing apparatus 10 embodying the invention. The apparatus 10 includes a voltage step-down transformer 12 having a primary winding 14 receiving an alternating signal at its terminals 16 and having a secondary step-down winding 18 connected to lines 20 and 22. Line 20 connects through a resistor 24 to the terminal 26 of a connecting means adapted to electrically engage the collector lead 28 of a transistor 30 to be tested. The line 22 is connected through a resistor 32 to the terminal 34 of the connecting means for electrically engaging the emitter lead 36 of the transistor 30.

Line 20 is connected to the cathode of a diode 38 and the anode of a diode 40 which respectively have their anode and cathode connected to terminals 42, 44 of a switch 46. The switch 46 has an armature 48 which is illustrated in FIGURE 1 in its first position engaging the contact 42 and is connected to a line 50. In its second position armature 48 of switch 46 engages contact 44. The line 22 is also connected to the cathode of a crystal diode 50 and the anode of a crystal diode 52 which respectively have their anode and cathode joined to terminals 54 and 56 of a switch 58. The switch 58 has an armature 60 which is shown in its first position engaging the contact 54 and which is electrically connected with line 50. In its second position the armature 60 of switch 58 engages the terminal 56. The line 50 is connected through a resistor 62 to the terminal 64 of the connecting means provided for engaging the base lead 66 of the transistor 30 being tested. The apparatus 10 provides an auxiliary shunt resistor 68 connected between the terminals 34 and 64 for providing the in-circuit testing features of the apparatus.

A switch 70 is provided having an armature 72 which engages the contact 74 in its first position, while engaging its contact 76 in the second position. A switch 78 is also provided having an armature 80 which engages its terminal 82 when in its first position, while engaging its terminal 84 in its second position.

Terminal 76 of switch 70 and terminal 82 of switch 78 are connected by a line 86 to the line 20. Similarly, contact 74 of switch 70 and contact 84 of switch 78 are joined by a line 88 with the terminal 26 of the transistor connecting means. A signal integrating capacitor 90 is connected across the resistor 24 between the lines 86 and 88.

The armature 80 of switch 78 is connected through a resistor 92 to the base lead 94 of a normally non-conducting transistor 96, while the armature 72 of the switch 70 is joined to the emitter lead 98 of the transistor 96 and returned to ground potential. The base lead 94 of the transistor 96 is returned to ground potential through a resistor 100 and connected to a negative potential of 1.4 volts through a resistor 102. The base lead 94 is also joined to ground potential through a signal intergrating capacitor 104, while its collector lead 106 is joined to ground potential through a resistor 108.

The collector electrode 106 of transistor 96 is also connected to a terminal 110 which is maintained at a positive potential of 30 volts through the energizing coil 112 of a relay 114. The armature 116 of relay 114 is connected through an indicating bulb 118 to ground potential and engages the open contact 120 when the relay is de-energized, while engaging the contact 122 upon the energization of the coil 112 of the relay 114. Contact 122 of relay 114 is returned directly to the positive potential terminal 110 for illuminating bulb 118 when the relay coil 114 is energized.

The switches 46, 58, 70 and 78 may be ganged for simultaneous movement for switching between their first and second positions. When the switches are each in their first positions as illustrated in FIGURE 1, the apparatus 10 is conditioned for testing a PNP type transistor, which may be in-circuit, while, when said switches are placed in their respective second positions, the apparatus 10 is conditioned for testing an NPN type transistor.

In operation, the apparatus 10 is caused to engage a transistor 30 to be tested by having its terminal 26 electrically contact the collector lead 28, the terminal 34 electrically engage the emitter lead 36, while the contact 64 electrically engages the base lead 66 of the transistor 30 to be tested. The transistor 30, need not be removed from its connections within a circuit and the electrical engagement by the apparatus 10 may be by temporary electrical contacts leaving unaltered the circuit including the transistor to be tested.

When the transistor 30 to be tested is connected in a circuit, its leads may be shunted by various impedances provided by the circuit within which it is connected. Such an in-circuit impedance is illustrated in the form of a resistor 124 connected between the emitter lead 36 and base lead 66 of the transistor 30 being tested. The illustrated shunt resistor 124 is connected in the configuration of FIGURE 1, since the presence of shunt resistance between the emitter lead 36 and base lead 66 provides the most difficult situation which must be overcome for providing reliable results for testing of in-circuit transistors by the apparatus 10.

FIGURE 2a and FIGURE 2b are helpful in illustrating the operation of the apparatus 10 by showing the equivalent circuit of the apparatus 10 during the first and second half cycles respectively of the alternating signal delivered by the transformer 12 to the lines 20, 22.

FIGURE 2a illustrates the equivalent circuit when a negative signal is delivered to the line 20, while a positive signal is delivered to line 22 during the first half cycle of the alternating signal provided by the transformer 12. Under these circumstances, with the switches positioned as shown in FIGURE 1 for testing a PNP type transistor, the terminal 64 is connected through the resistor 62 and the diode 38 to the line 20, while the diode 50 provides an open circuit as seen in FIGURE 2a.

During the following half cycle, when the positive signal is delivered to line 20 and the negative signal is delivered to line 22, the terminal 64 is connected through the resistor 62 and the crystal diode 50 to the line 22, while the diode 38 provides an open circuit as illustrated by FIGURE 2b.

In the configuration of the apparatus 10 shown in FIGURE 2a, current flows through the transistor 30 from the line 22 to the line 20. The current thus flows through the resistor 24 resulting in a negative potential drop across it. Similarly in the configuration of apparatus 10 shown in FIGURE 2b during the following half cycle, current flows from the line 20 to the line 22 through the transistor 30. The flow of such current through the resistor 24, in this case, results in a positive potential drop across the resistor 24. As will be shown, the relative value of the negative voltage drop across resistor 24 during the half cycle shown in FIGURE 2a, as compared with the positive voltage drop across resistor 24 occurring during the following half cycle illustrated by FIGURE 2b, will depend upon the values of the shunt resistances 68 and 124 in the case of an operative transistor 30.

For the purpose of illustrating the operation of the transistor testing apparatus 10, assume for now that the resistance of resistor 68 is infinite and the resistance of resistor 124 is greater than 5000 ohms. Under these conditions, the negative signal developed across resistor 24 in the configuration of FIGURE 2a, results in charging the capacitor 90 as shown by the portion 126 of the curve 128 in FIGURE 3. During the next half cycle shown in FIGURE 2b, the positive signal developed across the resistor 24 results in the discharge of the capacitor as shown by portion 130 of curve 128. As noted from curve 128, the charge on the capacitor 90 progressively becomes more negative, since the capacitor is charged negatively at a greater rate than it is discharged during the alternate half cycles. This is of course due to the fact that a larger negative voltage is developed across the resistor 24 when the transistor 30 is conducting in the forward direction as shown in FIGURE 2a, than the positive voltage developed across resistor 24 when the transistor 30 is conducting in the reverse direction as illustrated in FIGURE 2b. Thus, with operation of the apparatus 10, a negative voltage is developed and delivered over the line 86, indicating that the forward conduction through the transistor 30 is greater than the reverse conduction through the transistor 30. The development of the negative signal on line 86 indicates that the transistor 30 does not have an emitter to collector short circuit and that its conduction in one direction differs from its conduction in the other direction. The failure of the transistor 30 to develop a negative signal on the line 86, indicates an emitter to collector short circuit in the transistor 30, or the absence of a difference between forward and reverse conduction indicating an inoperative transistor.

In the case where the in-circuit shunt resistor 124 has a resistance of 2,000 ohms, curve 132 indicates the signal developed across the capacitor 90. In this case, the voltage drop during the forward conduction of the transistor 30 is indicated by the curve 134, while the positive voltage drop during reverse conduction is shown by the portion 136 of the curve 132 occurring during the alternate half cycles applied to the apparatus 10. In the case described, it is noted that the positive voltage drop during forward conduction is equal to the negative voltage drop across resistor 24 during reverse current conduction. This results in the failure of the integrating capacitor 90 to develop a negative voltage as in the case shown by curve 128, where the resistance of resistor 124 was greater than 5,000 ohms.

To explain the results achieved, it is noted that with the resistor 124 having a resistance of 2,000 ohms, the shunt resistor 124 acts to reduce the base drive of negative polarity delivered through the resistor 62 thereby reducing the forward current in the configuration of FIGURE 2a. In the next half cycle shown in FIGURE 2b, the shunt resistor 124 acts to increase the base drive for conduction in the reverse direction tending to increase the positive voltage drop across resistor 24 and acts to equalize the negative voltage drop occurring during the preceding half cycle. Under the above circumstances with the in-circuit shunt resistor 124 having a value of 2,000 ohms, a negative voltage is not delivered to the lead 86, and the transistor 30 would appear to be an inoperative transistor, when the transistor 30 may actually be in operative condition.

The curve 138 of FIGURE 3 illustrates the voltage developed across the capacitor 90 and delivered to the line 86, in the case where the in-circuit shunt resistance 124 has a resistance less than 1,000 ohms. In this case, the negative drop across the resistor 24 during the forward conduction half cycle is shown by the portion 140, while the positive drop across the resistor 24 during the reverse conduction half cycle is shown by the portion 142 of the curve 138. It is noted that under these circumstances, the negative voltage drop across resistor 24 is less than the positive voltage drop across resistor 24 during their respective half cycles, resulting in a positive accumulation of charge on the capacitor 90.

This is explained by the fact that the reduction of shunt resistance results in the further reduction of the base drive signal delivered through resistor 62 to the base lead of transistor 30 during the forward conduction of current in the configuration shown in FIGURE 2a, while during the next half cycle for the configuration shown in FIGURE 2b, the reduced resistance of resistor 124 acts to further increase the base drive for reverse current conduction, thereby resulting in greater reverse current flow. Thus there results a greater reverse current flow than forward current flow during respective half cycles, providing the positive voltage on line 86.

Therefore, for an operative transistor under test, a positive, negative or average zero voltage signal may be developed depending upon the in-circuit arrangements within which the transistor 30 being tested is connected. Such results of course provide uncertainty, especially since when no positive or negative signal is developed by the apparatus 10, it is uncertain whether this result is due to the fact that the emitter and collector leads are shorted, the transistor does not have different backward and forward current conductivities, or whether this is due to the shunt resistors connected in-circuit with the transistor 30. In order to overcome this difficulty, the apparatus 10 provides the auxiliary shunt resistor 68, which has a value of resistance less than 1,000 ohms and a value preferably chosen to be 680 ohms.

With an auxiliary shunt resistance 68 of 680 ohms, the shunt resistance between the emitter and base leads is less than 1,000 ohms. Thus for an operative transistor, a positive voltage will be developed as indicated by curve 138 and with the accumulation of charge on the capacitor 90, a positive voltage signal will be delivered to line 86 when the transistor 90 is operative. An average zero voltage signal cannot be delivered by the line 86, since the resistance of 680 ohms of resistor 68 is lower than and prevents the presence of a shunt resistance of 2,000 ohms which would provide a zero average signal on line 86 even when an operative transistor is being tested. Thus a zero voltage will be delivered on line 86 only for the situation where an in-circuit transistor 30 is inoperative.

For an operative transistor 30 being tested, a positive signal is delivered over the line 86 through the switch 78 to the base lead 94 of the transistor 96 making transistor 96 conductive. The conduction of transistor 96, results in its drawing current through the energizing coil 112 of the relay 114 activating the relay 114 and causing its armature 116 to engage contact 122. This results in the illumination of bulb 118 indicating that the transistor 30 under test is operative. In the absence of a positive voltage signal developed on line 86, the transistor 96 remains nonconducting so that relay 114 maintains its inactive state and bulb 118 remains nonilluminated indicating an inoperative transistor 30. It is noted that an inoperative transistor 30 will be indicated when there is an emitter to collector short circuit in the transistor 30, or the reverse and forward currents through the transistor are of equal amplitude.

FIGURES 4a and 4b are respectively identical to FIGURES 2a and 2b for indicating alternate half cycles of energization by the alternating current of the apparatus 10 of FIGURE 1, with the emitter and collector leads 36, 28 reversely connected to the collector and emitter terminals 26, 34. With the transistor 30 connected in such alternate manner, the voltages developed across the resistor 24 are illustrated by the curves 144, 146 and 148, when the resistance of resistor 68 is infinite and the resistance of the shunt resistor 124 is respectively greater than 5,000 ohms, approximately equal to 2,000 ohms, and less than 1,000 ohms. In comparing the curves of FIGURE 5 with the curves of FIGURE 3, it is noted that when the shunt resistance 124 is greater than 5,000 ohms, the curve 144 provides a positive accumulation of charge on the capacitor 90, while the curve 128 of FIGURE 3 shows the negative accumulation of charge. Similarly when the shunt resistance 124 has a resistance less than 1,000 ohms, curve 148 of FIGURE 5 shows the accumulation of negative charge on the capacitor 90, while curve 138 of FIGURE 3 shows the accumulation of a positive charge. The reversal of transistor emitter and collector lead connections of the transistor 30, thus, also results in reversal of the charges accumulated by the capacitor 90 for different values of resistance for the shunt resistor 124. However, when the shunt resistor 124 has a resistance of approximately 2,000 ohms, curve 146 of FIGURE 5 is similar to curve 132 of FIGURE 3 and shows zero average accumulation of charge on the capacitor 90.

It is noted that with the reversal of the connections of the emitter and collector terminals 34, 26 of the apparatus 10 with the emitter and collector leads 36, 28 of the transistor 30, the in-circuit shunt resistor 124 remains unchanged in its connection between the emitter lead 36 and the base lead 66 of the in-circuit transistor 30.

It is noted that the reversal of charges accumulated at the capacitor 90 results from the fact that in FIGURE 4a, the transistor 30 conducts in the reverse direction to provide a negative voltage drop across resistor 24, while in FIGURE 4b the transistor 30 conducts in the forward direction to provide a positive voltage drop across resistor 24. Thus, for a high resistance of the resistor 124, a larger positive voltage drop occurs across resistor 24 occurring during the half cycle represented by FIGURE 4b than the negative voltage drop across resistor 24 occurring during the half cycle represented by FIGURE 4a, providing the rising voltage curve of FIGURE 5. The reduction of the resistance of resistor 124 to a value of 2,000 ohms and to a value less than 1,000 ohms, similarly results in the reduction of the average output voltage on line 86 to a zero value and, to a negative voltage respectively, for similar reasons given in connection with FIGURES 2a and 2b.

In the presently illustrated embodiment of the apparatus 10 with the auxiliary resistor 68 having a resistance of 680 ohms, the effect produced by the shunt resistor 124 having a value less than 5,000 ohms is overcome as follows. The increased drive to the base lead 66 of transistor 30 in the configuration shown in FIGURE 4a, is balanced or nullified by the opposite drive signal delivered by the resistance 68, so that the negative voltage developed across the resistance 24 is not increased by the drive provided by the resistor 124. In FIGURE 4b, the additional drive to the base lead of transistor 30 provided by the auxiliary shunt resistor 68, compensates for the opposite drive to the base lead of transistor 30 provided by the shunt resistor 124, thereby maintaining the positive voltage drop across the resistor 24 at a value greater than the negative voltage drop across resistor 24 occurring during the preceding half cycle illustrated by FIGURE 4a. Under these circumstances, the capacitor 90 for an operative transistor 30, accumulates a positive charge as illustrated by curve 144 of FIGURE 5, so that a positive voltage signal is delivered to the line 86. Such a positive signal will result in the energization of the relay 114 as previously explained, illuminating the bulb 118 for indicating an operative transistor. Of course, if an inoperative transistor 30 is being tested, a positive voltage will not be developed across the integrating capacitor 90 and the failure of the bulb 118 to light will indicate this condition.

From the above description, it is apparent that a dynamic test may be made of the in-circuit transistor in which it is only necessary to know the identity of the base lead, since the connection of the other two collector and emitter leads to the remaining collector and emitter terminals 26, 34 of the apparatus 10 in either combination will result in the indication of an operative transistor when such a transistor is being tested. If desired, the test may be performed twice with the collector and emitter terminals 36 and 34 connected in both possible ways for obtaining a double check on the operativeness of the transistor 30 being tested.

In the case where an NPN type transistor is to be tested, the ganged switches 46, 48, 70 and 78 are actuated to their second positions, in which case, the apparatus 10 operates in a similar manner and develops a positive signal on the line 88 for delivery to the base lead 94 of the transistor 96 for indicating the presence of an operative transistor under test. The switches in their second positions appropriately alter the applied voltages by delivering a positive signal to the base lead 66 of the NPN type transistor being tested to adapt the apparatus for testing the NPN type transistor in the manner analogous to the PNP type transistor described above in detail. From the description given above in connection with the PNP type transistor, it will be obvious to those skilled in the art, the manner in which the apparatus 10 operates to test the NPN type transistor with its switches in their second positions.

While this invention has been described and illustrated with reference to a specific embodiment, it is to be understood that the invention is capable of various modifications and applications, not departing essentially from the spirit thereof, which will become apparent to those skilled in the art.

What is claimed is:

1. An in-circuit transistor testing apparatus comprising:
    (a) first, second and third connecting means for respectively electrically engaging the base and remaining leads of a transistor to be tested,
    (b) first, second and third impedance means each having a first end respectively connected with said first, second and third connecting means and a second end,
    (c) shunt impedance means having first and second ends respectively connected between said first connecting means and one of the remaining second and third connecting means of (a), said shunt impedance means having an impedance value such that the total shunt impedance provided by said shunt impedance and any in-circuit impedance in shunt therewith does not exceed 2000 ohms,
    (d) means delivering signals to the second ends of said impedance means of (b) for applying either a negative or positive signal to the first connecting means and applying alternating signals of opposite polarity to the second and third connecting means of (a),
    (e) and an output line connected with said second impedance means of (b) for deriving a signal of predetermined polarity responsive to the operativeness of an in-circuit transistor being tested.

2. The apparatus of claim 1 in which:
    (f) said shunt impedance means of (c) has an impedance of less than 1000 ohms.

3. The apparatus of claim 2 in which:
    (g) said impedance means of (b) and said shunt impedance means of (c) are resistors.

4. The apparatus of claim 3 in which:
    (h) said shunt impedance means of (c) has a resistance of 680 ohms.

5. An in-circuit transistor testing apparatus comprising:
    (a) first, second and third connecting means for respectively electrically engaging the first base lead and the second and third leads of a transistor to be tested,
    (b) energizing means having first and second terminals for delivering an alternating voltage,
    (c) first and second impedance means respectively connecting the second and third connecting means of (a) with the first and second terminals of said energizing means,
    (d) first and second unidirectional conducting means joining the first connecting means of (a) respectively with first and second terminals of said energizing means,
    (e) third shunt impedance means connecting said first and second connecting means of (a), said third shunt impedance means having an impedance value such that the total shunt impedance provided by said third shunt impedance and any in-circuit impedance in shunt therewith does not exceed 2000 ohms,
    (f) and means for detecting directional current flow through said transistor for providing a predetermined signal for determining the operativeness of the in-circuit transistor being tested.

6. The apparatus of claim 5 in which:
    (g) said first and second unidirectional conducting means comprise crystal diode units, (h) and said third shunt impedance means of (e) is less than 1000 ohms.

7. The apparatus of claim 6 in which:
(i) said means (f) detects the polarity and average voltage drop across said first impedance means (c) for determining the operativeness of the in-circuit transistor being tested,
(j) and said first and second impedance means of (c) and said third shunt impedance means of (e) are resistors.

8. The apparatus of claim 7 including:
(k) switching means having first and second positions joining said first and second unidirectional conducting means with a predetermined polarity between said first connecting means and respectively said first and second terminals of said energizing means in its first position, and reversing the polarity of said unidirectional conducting means in its second position,
(1) and said shunt impedance means of (e) has a resistance of 680 ohms.

9. The apparatus of claim 8 in which:
(m) said switching means in its first said position poles said unidirectional means to conduct current in the direction to its respective said terminal of said energizing means from the first connecting means of (a) for testing a PNP type transistor, and
(n) said switching means in its second said position poles said unidirectional means to conduct current from its respective said terminal of said energizing means to the first connecting means of (a) for testing an NPN type transistor.

References Cited

UNITED STATES PATENTS 2,922,954  1/1960  Bigelow _____ 324—158
3,356,945  12/1967  Ryan et al. _____ 324—158

RUDOLPH V. ROLINEC, *Primary Examiner.*

E. L. STOLARUN, *Assistant Examiner.*